J. M. CARNAHAN.
Animal-Traps.
No. 147,899.
Patented Feb. 24, 1874.
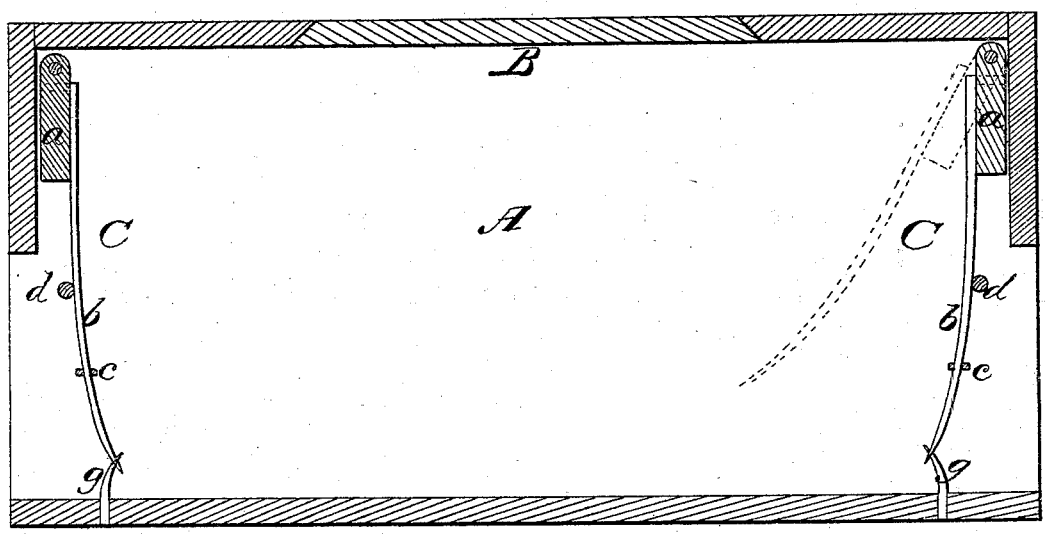
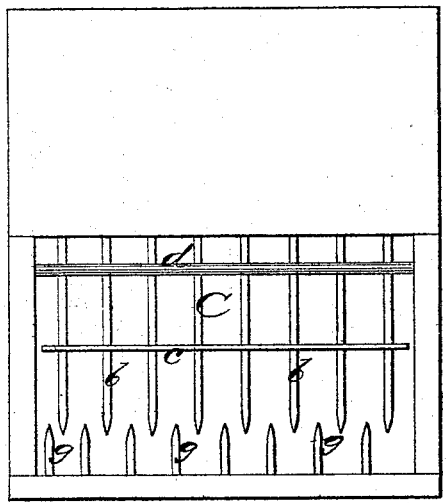

UNITED STATES PATENT OFFICE.

JAMES M. CARNAHAN, OF TIDIOUTE, PENNSYLVANIA.

IMPROVEMENT IN ANIMAL-TRAPS.

Specification forming part of Letters Patent No. 147,899, dated February 24, 1874; application filed January 31, 1874.

*To all whom it may concern:*

Be it known that I, JAMES M. CARNAHAN, of Tidioute, in the county of Warren and State of Pennsylvania, have invented a new and valuable Improvement in Animal-Traps; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my animal-trap. Fig. 2 is an end view of the same.

This invention has relation to traps for catching rats and other animals; and it consists in a suspended swinging gate composed of curved rods pointed at their lower ends, and arranged over fixed points at the end of a suitable trap-box, as will be hereinafter explained.

In the annexed drawings, A designates a trap-box, of rectangular form which is open at both ends and provided with a door or slide, B. At each end of the box A is a swinging gate, C, which is composed of a pivoted cross-bar, $a$, and curved rods $b$, having their lower ends pointed, which rods are prevented from being separated by an animal attempting to escape from the trap by means of a brace or tie-plate, $c$, through which the rods or teeth $b$ pass. This gate is allowed to swing inwardly, but is prevented from swinging too far outwardly by means of a fixed cross-bar, $d$. The lower pointed ends of the swinging gate-rods extend down nearly to the bottom of the box A, and beneath these rods sharp spurs, $g$, are fixed into the said bottom, which spurs, together with the points on the gate, will effectually prevent an animal from making its escape from the trap after once getting into it.

By having the gate C suspended free from the bottom of the trap, animals can readily push it up and walk under it, and after the animal once attempts to enter the trap and gets its head between the fixed and swinging spurs, it will be compelled to pass in.

What I claim as new, and desire to secure by Letters Patent, is—

In an animal-trap, the suspended swinging gate C, composed of the parts $a\ b\ c$, in combination with fixed spurs $g$, substantially as described.

In testimony that I claim the above I have hereunto subscribed my name in the presence of two witnesses.

JAMES McCORMICK CARNAHAN.

Witnesses:
M. G. CUSHING,
JOHN TONKIN, Jr.